(12) United States Patent
Grosch et al.

(10) Patent No.: US 6,362,126 B1
(45) Date of Patent: Mar. 26, 2002

(54) SUPPORTED DOUBLE METAL CYANIDE CATALYSTS, METHOD FOR PRODUCING THEM, AND THEIR USE FOR PRODUCING POLYETHER ALCOHOLS

(75) Inventors: Georg Heinrich Grosch, Bad Dürkheim; Harald Larbig, Ludwigshafen; Reinhard Lorenz, Limburgerhof; Dieter Junge, Frankenthal; Ulrich Kammel, Speyer, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,553

(22) PCT Filed: Feb. 23, 1999

(86) PCT No.: PCT/EP99/01151

§ 371 Date: Sep. 5, 2000

§ 102(e) Date: Sep. 5, 2000

(87) PCT Pub. No.: WO99/44739

PCT Pub. Date: Sep. 10, 1999

(30) Foreign Application Priority Data

Mar. 5, 1998 (DE) .......................... 198 09 539

(51) Int. Cl.$^7$ .......................... B01J 31/00; B01J 27/26; B01J 21/18; C07C 43/11; C07C 41/00

(52) U.S. Cl. ........................ 502/154; 502/104; 502/152; 502/153; 502/159; 502/172; 502/175; 502/183; 502/200; 568/620; 568/621; 568/679; 568/613

(58) Field of Search ................... 502/104, 152, 502/153, 154, 159, 172, 175, 183, 200; 568/613, 620, 621, 679

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,427,256 A | 2/1969 | Milgrom | |
| 4,394,298 A | 7/1983 | Nowack et al. | |
| 4,843,054 A | 6/1989 | Harper | |
| 5,426,081 A | 6/1995 | Le-Khac | |
| 5,489,583 A | 2/1996 | Mack et al. | |
| 5,523,386 A | 6/1996 | Le-Khac | |
| 5,525,565 A | 6/1996 | Le-Khac | |

FOREIGN PATENT DOCUMENTS

| | | |
|---|---|---|
| DE | 203734 | 11/1983 |
| DE | 203735 | 11/1983 |
| EP | A-0-283 148 A3 | 9/1988 |
| EP | A-0 283 148 B1 | 9/1988 |
| EP | A-0- 283 148 A2 | 9/1988 |
| EP | 283148 | 9/1988 |
| EP | 659 798 | 6/1995 |
| JP | 6041293 | 7/1992 |
| JP | 6248068 | 2/1993 |

OTHER PUBLICATIONS

PCT International Preliminary Examination Report (Jul. 3, 2000), 4 page.
Derwent Abstract of JP 6248068.
Derwent Abstract of JP 6041293.
Derwent Abstract of DD 203 734.
Derwent Abstract of DD 203 735.

*Primary Examiner*—Samuel Barts
*Assistant Examiner*—Elvis O. Prize
(74) *Attorney, Agent, or Firm*—Ferrando A. Borrego

(57) ABSTRACT

Double-metal cyanide catalysts of the formula $$M^1_a[M^2(CN)_b(A)_c]_d \cdot fM^1_gX_n \cdot h(H_2O) \cdot eL,$$ where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$ and $Cd^{2+}$, $M^2$ is a metal ion selected from the group consisting of $Fe^{2+}$, $Fe_{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$ and $M^1$ and $M^2$ are identical or different, A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, ureas, amides, nitriles and sulfides, a, b, c, d, g and n are selected so as to make the compound electrically neutral, and e denotes the coordination number of the ligand, e and f denote fractions or integers greater than or equal to zero, h denotes a fraction or integer greater than or equal to zero, wherein the double-metal cyanides have been applied to or incorporated into solid, inert, unfoamed supports or have been shaped to give moldings.

16 Claims, No Drawings

SUPPORTED DOUBLE METAL CYANIDE CATALYSTS, METHOD FOR PRODUCING THEM, AND THEIR USE FOR PRODUCING POLYETHER ALCOHOLS

This National Phase application of PCT/EP99/01151 application filed, Feb. 23, 1999.

The present invention relates to double-metal cyanide catalysts, to their preparation, and to their use for preparing polyether alcohols having a low content of unsaturated compounds.

Polyether alcohols are important starting materials in the preparation of polyurethanes. They are usually prepared by the catalyst addition reaction of lower alkylene oxides, in particular ethylene oxide and propylene oxide, onto H-functional initiator substances. The catalysts used are usually basic metal hydroxides or salts, with potassium hydroxide having the greatest practical importance.

In the preparation of polyether alcohols having long chains, as are used, in particular, for producing flexible polyurethane foams, advancing chain growth is associated with secondary reactions, which lead to byproducts. These byproducts are referred to as unsaturated constituents. They are monofunctional regarding their OH functionality and lead to impairment of the properties of the resulting polyurethanes. There has therefore been no lack of attempts to prepare polyether alcohols having a low content of unsaturated constituents. Thus, EP-A 268 922 proposes using cesium hydroxide as catalyst. Although this can significantly lower the content of unsaturated constituents, cesium hydroxide is expensive and presents a disposal problem.

It is furthermore known to use multimetal cyanide compounds, in particular zinc hexacyanometallates, as catalysts. A large number of documents describe the preparation of such compounds. For example, DD-A-203 734 and DD-A-203 735 describe the preparation of polyether alcohols using zinc hexacyanocobaltate.

The preparation of the zinc hexacyanometallates is also known. It is usually carried out by reacting solutions of metal salts, mostly zinc chloride, with solutions of alkali metal or alkaline earth metal cyanometallates, such as potassium hexacyanocobaltate. In general, the precipitation procedure is immediately followed by addition of a water-miscible component containing one or more heteroatoms to the resultant precipitation suspension. This component can also be present beforehand in one or both starting solutions. This water-miscible, heteroatom-containing component can preferably be an ether, polyether, alcohol, ketone or a mixture of at least two of said compounds. Such processes are described, for example, in U.S. Pat. No. 3,278,457, U.S. Pat. No. 3,278,458, U.S. Pat. No. 3,278,459 and U.S. Pat. No. 3,427,256.

DD-A-148 957 describes the preparation of zinc hexacyanoiridate and its use as a catalyst in the preparation of polyether alcohols. One starting material used here in place of the corresponding salt is hexacyanoiridic acid. The double-metal cyanide compounds prepared by means of acid usually have higher activity than those prepared by means of hexacyanometallate salts.

At present, polyether alcohols are prepared in batch processes. In these, the catalyst is suspended in the initiator. When the reaction is complete, the catalyst must be separated from the final product. It would be cheaper to carry out the reaction using a preformed catalyst which can be removed simply from the final product after the reaction or, if desired, immobilized in a fixed bed, so that work-up of the polyether alcohol requires negligible effort. U.S. Pat. No. 5,525,565, U.S. Pat. No. 5,523,386, U.S. Pat. No. 5,489,583, U.S. Pat. No. 5,426,081 and EP-A-659 798 disclose foam-supported double-metal cyanide catalysts. However, the inadequate mechanical strength of the foam means that these are not very suitable as fixed-bed catalysts.

It is an object of the present invention to provide double-metal cyanide catalysts which are simple to separate from the polyetherol and, if desired, allow the polyether alcohol synthesis to be carried out continuously.

We have found that this object is achieved by applying double-metal cyanide complexes to solid supports or incorporating them in solid supports or by shaping the double-metal cyanide complexes to give moldings.

Accordingly, the present invention provides double-metal cyanide catalysts of the formula

where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$ and $Cd^{2+}$, preferably $Zn^{2+}$, $Fe^{2+}$, $Ni^{2+}$, $Mn^{2+}$, $Co^{2+}$ and $Cr^{2+}$, particularly preferably $Zn^{2+}$, $M^2$ is a metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$ and $Cr^{2+}$, preferably $Co^{3+}$, $Fe^{3+}$, $Fe^{2+}$, $Rh^{3+}$ and $Ir^{3+}$, particularly preferably $Co^{3+}$, $Rh^{3+}$, $Ir^{3+}$ and $Fe^{3+}$, where $M^2$ can be identical to or different from $M^1$, A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is at least one water-miscible organic ligand selected from the group consisting of alcohols, aldehydes, ketones, ethers, polyethers, esters, ureas, amides, nitriles and sulfides, a, b, c, d, g and n are selected so as to make the compound electrically neutral, e denotes the coordination number of the ligand, e and f denote fractions or integers greater than or equal to zero, h denotes a fraction or integer greater than or equal to zero, which have been applied to solid, unfoamed supports or incorporated therein or have been shaped to give moldings.

The supports according to the invention are macroscopic moldings, as are usual and known as catalyst supports, for example extrudates, grit, tablets, meshes, packing elements, fabrics, fibers, balls and the interior walls of reactors. The macroscopic moldings can consist of inorganic and/or organic materials. Examples of inorganic materials are oxides, carbides, nitrides and inert metals. Examples of carbides are transition-metal carbides, such as tungsten carbide, silicon carbide and boron carbide. Examples of suitable nitrides are boron nitride, silicon nitride and aluminum nitride. Suitable inert metals are metals or metal alloys which are inert in the reaction medium used in the double-metal cyanide synthesis and in the polyether alcohol synthesis. Examples thereof are steels, aluminum, noble metals, nickel, stainless steels, titanium, tantalum and Kanthal. Oxides which can be used are metal oxides which are inert under said reaction conditions, in particular those of metals from groups IIA to IVA and IB to VIIIb, and oxidic compounds containing elements from groups IA to VIIA and/or metals from groups Ib to VIIIb.

The novel catalysts can be prepared by applying the double-metal cyanide complexes to the surface of the shaped supports or by mixing double-metal cyanide complexes with unshaped support material and then shaping the mixture. It is also possible to shape pulverulent double-metal cyanide complexes to give unsupported catalysts.

The double-metal cyanide complexes can be prepared by conventional processes.

The process of the present invention is divided into the following process steps:

a) reaction of an aqueous solution of a water-soluble metal salt of the formula $M^1_m(X)_n$, where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cr^{3+}$ and $Cd^{2+}$, X is an anion selected from the group consisting of halide, hydroxide, sulfate, carbonate, cyanide, thiocyanate, isocyanate, carboxylate, in particular formate, acetate, propionate and oxalate, and nitrate, and m and n are integers which satisfy the valences of $M^1$ and X, with an aqueous solution of the cyanometallate compound of the formula $H_a M^2(CN)_b(A)_c$, where $M^2$ is a metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$ and $Cr^{2+}$, and $M^2$ can be identical to or different from $M^1$, H is hydrogen or a metal ion, usually an alkali metal ion, alkaline earth metal ion or ammonium ion, A is an anion selected from the group consisting of halide, hydroxide, sulfate, carbonate, cyanate, thiocyanate, isocyanate, carboxylate and nitrate, in particular cyanide, where A may be identical to or different from X, and a, b and c are integers selected so that the cyanide compound is electrically neutral, where one or both solutions may, if desired, contain at least one water-miscible, heteroatom-containing ligand selected from the group consisting of alcohols, aldehydes, ketones, ethers, polyethers, esters, ureas, amides, nitrites and sulfides, b) combination of the aqueous suspension formed in step a) with a water-miscible, heteroatom-containing ligand which is selected from the group described above and may be identical to or different from the ligand in step a), and c) if desired, separation of the multimetal cyanide compound from the suspension.

It is advantageous for the novel process if the cyanometallate compound used is the acid, since no salt is then formed.

These cyanometallic acids which can be used are stable and easy to handle in aqueous solution. They can be prepared, for example, as described in W. Klemm, W. Brandt, R. Hoppe, z. Anorg. Allg. Chem. 308, 179 (1961), starting from the alkali metal cyanometallate via the silver cyanometallate to give the cyanometallic acid. A further possibility is to convert an alkali metal cyanometallate or alkaline earth metal cyanometallate into a cyanometallic acid by means of an acid ion exchanger, as described, for example, in F. Hein, H. Lilie, Z. Anorg. Allg. Chem. 270, 45 (1952), or A. Ludi, H. U. Güdel, V. Dvorak, Helv. Chim. Acta 50, 2035 (1967). Other ways of synthesizing the cyanometallic acids are given, for example, in "Handbuch der Präparativen Anorganischen Chemie", G. Brauer (editor), Ferdinand Enke Verlag, Stuttgart, 1981. For the industrial preparation of these compounds, as is necessary for the novel process, the synthesis via ion exchangers is the most advantageous route. The cyanometallic acid solutions can be processed further immediately after the synthesis, but it is also possible to store them for an extended period. Such storage should be in the absence of light in order to prevent decomposition of the acid.

The proportion of acid in the solution should be greater than 80% by weight, preferably greater than 90% by weight, in particular greater than 95% by weight, based on the total weight of cyanometallate complexes.

The heteroatom-containing ligands used are the organic substances described above.

In order to carry out the novel process, an aqueous solution of a cyanometallic acid or of a cyanometallate salt is combined with the aqueous solution of a metal salt of the formula $M^1_m(X)_n$, where the symbols are as defined above. A stoichiometric excess of the metal salt is employed. Preference is given to a molar ratio between the metal ion and the cyanometallate component of from 1.1 to 7.0, preferably from 1.2 to 5.0, particularly preferably from 1.3 to 3.0. It is advantageous to introduce the metal salt solution into the reaction vessel and then to add the solution of the cyanometallic acid, but the reverse procedure can also be used. Good mixing, for example by stirring, is necessary during and after combination of the starting solutions.

The cyanometallate compound content in the solution is from 0.1 to 30% by weight, preferably from 0.1 to 20% by weight, in particular from 0.2 to 10% by weight, and the metal salt component content in the solution is from 0.1 to 50% by weight, preferably from 0.2 to 40% by weight, in particular from 0.5 to 30% by weight.

The heteroatom-containing ligands are, in particular, added to the resultant suspension after the two starting solutions have been combined; good mixing is again necessary here.

However, it is also possible to add some or all of the ligand to one or both of the starting solutions. In this case, the change in the salt solubilities means that the ligand should preferably be added to the cyanometallate compound solution.

The ligand content in the suspension should be from 1 to 60% by weight, preferably from 5 to 40% by weight, in particular from 10 to 30% by weight.

The double-metal cyanides applied according to the invention to solid, inert, unfoamed solids or incorporated therein or shaped to give moldings may be crystalline or amorphous. The term crystalline double-metal cyanides is taken to mean double-metal cyanides whose greatest reflection in the X-ray diffraction diagram is at least three times as intense as the background of the measurement. Crystalline double-metal cyanides may furthermore be cubic or exhibit x-ray diffraction diagrams as described in EP-A 755 715 or EP 862 947. The term amorphous double-metal cyanides is taken to mean double-metal cyanides whose strongest reflection in the X-ray diffraction diagram has an intensity less than three times the intensity of the background or which exhibit X-ray diffraction diagrams as described in EP-A 654 302 and EP-A 743 093.

There are several processes which can be used according to the invention for the shaping of the multimetal cyanide compound.

One process for applying the multimetal cyanide compound to an inert molding is, for example, to spray the latter with a suspension of the multimetal cyanide powder in an inert liquid. The spray suspension can either be the precipitation slurry of the multimetal cyanide compound or a suspension of the pre-synthesized and possibly pre-dried multimetal cyanide compound in a suitable suspension liquid. If the precipitation slurry is used directly for the spraying, preference is given to multimetal cyanide compounds prepared using the cyanometallic acid, since the acids formed as byproducts can be separated from the multimetal cyanide compound during the spraying operation. If the starting components used for the precipitation of the multimetal cyanide catalysts are alkali metal and/or alkaline earth metal cyanometallates, the byproducts formed are alkali metal and/or alkaline earth metal salts. In order to separate these from the multimetal cyanide compound, either the multimetal cyanide compounds prepared can be separated from the precipitation suspension, washed until free from byproducts, dried if necesary and then re-suspended, or the precipitation suspension can be sprayed on directly and an attempt made to wash the alkali metal salts and/or alkaline earth metal salts out by subsequent washing of the supported multimetal cyanide compound. In order to increase the adhesion of the sprayed-on multimetal cyanide compound to the molding, an organic or inorganic polymer can additionally be added to the spray suspension. This organic or inorganic polymer can contain active hydrogen atoms. However, preference is given to polymeric compounds containing no active hydrogen atoms.

The adhesion can furthermore be increased by employing reactive inorganic or organic substances, either in pure form or in the form of solutions, dispersions or emulsions, which can react either chemically, thermally or photochemically, i.e. are crosslinked, and thus enable strong bonding of the active material to the support.

Preference is given to reactive organic polymers whose crosslinking products form porous structures.

These application processes described above are also suitable if it is desired to apply the multimetal cyanide compounds to the interior walls of reactors.

Besides spraying-on a suspension containing multimetal cyanide compound, the multimetal cyanide powder can be applied to the molding directly analogously to a high-solids coating process. In general, this method involves spraying the moldings with an adhesion-promoting liquid in parallel to the feed of the powder. This is only suitable for multimetal cyanide powders which are free from any byproducts, such as alkali metal and/or alkaline earth metal salts. As in spraying-on, organic or inorganic polymers which increase the adhesion between multimetal cyanide compound and molding can be added to either the adhesion-promoting liquid or to the multimetal cyanide powder.

Reactive, i.e. crosslinking, inorganic or organic components can again be added here.

Another way of applying the multimetal cyanide compound to the molding is direct synthesis of the multimetal cyanide compound on the molding. To this end, the various solutions containing the starting materials, namely the cyanometallate and the metal salt component, are brought into contact with the molding either simultaneously or one shortly after the other. The bringing-into-contact of the molding with the solutions can take place by spraying, dipping, impregnation or similar procedures. The organic, water-miscible, heteroatom-containing ligands can in this case either be added to one of the two solutions or to both solutions. If the two liquids are mixed on the molding, precipitation of the multimetal cyanide compound takes place directly on the molding. Direct growing of the multimetal cyanide crystals on the molding generally gives very good adhesion to the molding. If the adhesion of the multimetal cyanide component should nevertheless be inadequate, an adhesion-promoting, organic or inorganic polymer can be added to one of the two solutions or to both solutions. If the cyanometallate component used is a cyanometallic acid, the resultant acids can be removed via the gas phase. If alkali metal and/or alkaline earth metal cyanometallates remain after the spraying, alkali metal and/or alkaline earth metal salts remain on the catalyst as byproducts. These byproducts can then be removed by washing the catalyst with water or other liquids or liquid mixtures which dissolve the byproducts. This process is likewise suitable for coating interior walls of reactors with multimetal cyanide compounds.

In the preparation processes described above for the catalysts according to the invention, the multimetal cyanide compounds are applied to inert moldings. However, shaped multimetal cyanide compounds can also be prepared by preparing unsupported catalysts from the multimetal cyanide powders. This can be done by tableting or extrusion. Depending on the multimetal cyanide compound preparation costs, a decision will be made in favor of either supporting multimetal cyanide compounds or inert moldings or shaping multimetal cyanide compounds to give full catalysts. In the case of tableting of multimetal cyanide compounds, lubricants must generally additionally be added. These can be graphite, boron nitride or organic molecules, such as stearates or alginates. Multimetal cyanide compounds are not heated to above 200° C., preferably 100° C., after the shaping step.

During extrusion, the multimetal cyanide compounds are firstly converted into a plastic material in kneader, pan grinder or similar apparatus using a mixing liquid. In this compounding step, further ingredients can be added to the resultant material. These ingredients either improve the properties of the plastic material during the actual shaping step or give the moldings produced from this material better cohesion. The experts know of innumerable ways of using a wide variety of additives. If additives for improving the cohesion of the molding are added to the plastic material, it must be ensured that they develop their binder action even without a high-temperature step at above 200° C. after the shaping. Furthermore, the additives should not reduce the catalytic activity of the multimetal cyanide compound. The contents of the additives are not critical; they should be sufficiently high that they fully develop their action, but not so high that the catalytic action of the multimetal cyanide compound is reduced.

Another possibility is to include multimetal cyanide compounds in a solid matrix. The solid matrix can be of an inorganic or organic nature.

In order to include a double-metal cyanide complex in an inorganic matrix, the corresponding DMC compound can be suspended in metal acid esters or alkoxymetallates. Addition of base or acid allows the metal acid esters to be polymerized to give solid substances. Preference is given here to the esters of silicic, aluminic, titanic and/or zirconic acids.

The organic components used can be any substances or substance mixtures in which the DMC can be suspended and which can be polymerized in whatever way to give solids.

The polymerization should be carried out in such a way that the solids particles formed can be used in a fixed-bed arrangement. Furthermore, the solids particles obtained should have adequate porosity to enable the starting materials and products to be transported to and away from the DMC. In order to improve the porosity, it is possible to add auxiliaries during the polymerization; the auxiliaries can be removed after the polymerization by physical or chemical treatment.

The novel process is preferably carried out in various variants, which are described in greater detail below:

An advantageous embodiment of the novel process is the continuous fixed-bed method, in which the catalyst used in accordance with the invention is fixed in a reactor. The fixed bed can have the following designs:

- as a filled tube with retention device, with axial flow through the tube, for example a shaft furnace,
- as a tubular reactor with retention device, for example a screen,
- as a fixed bed through which flow is radial, for example a stationary or rotating basket.

It is also possible to connect a number of said reaction apparatuses in series. This enables the process to be carried out in a plurality of process steps. It is also possible to operate a number of reactors in parallel within a single process step. This method is also known as the serial method.

The heat of reaction here can be dissipated, for example, via a reactor jacket, via welded-on half pipe coils or pipe coils, via cooling tubes in the reactor, downstream or upstream heat exchangers, a total condenser in the boiling method, or any desired combination of said variants.

In the continuous method, the reaction mixture is circulated. This is usually achieved by pumping the reaction mixture through an external circuit. It is also possible for a heat exchanger to be incorporated into this external circuit.

The heat of reaction here can be dissipated, for example, via a reactor jacket, via welded-on half pipe coils or pipe coils, via cooling tubes in the reactor, downstream or upstream heat exchangers, a total condenser in the boiling method, or any desired combination of said variants.

In the multistep method, the partially alkoxylated initiator is preferably added in the first steps of the process; the alkylene oxide can be metered in during any process step. Preferred starting material metering points are upstream of the circulation pump, between the circulation pump and the reactor, and, in the case of a number of reactors connected in series, in a reaction step between the reactors or between the reactor and the heat exchanger. The feed and mixing of the starting materials can be effected with or without a static mixer.

It is also possible to install a hold tank in the circuit. The mixing of the starting materials with the reaction solution can take place therein via a dip tube, a nozzle or by a combination of the two. It is also possible to connect a number of fixed-bed reactors in parallel. In the case of such a procedure, the liquid flow rate can be reduced and the heat dissipation improved. It is also possible to connect a number of reaction steps in series, preferably in from 2 to 4 steps. This procedure gives polyether alcohols having a particularly narrow molecular weight distribution. A side stream can be fed back from the various reaction steps for partial alkoxylation of the initiator. In addition, the various reactionsteps can be utilized to incorporate different segments or blocks into the polyether chain, for example mixed blocks of ethylene oxide and propylene oxide.

Discharge of the finished polyether alcohol from the circuit is carried out, if the reactors are connected in series, at the end of the final step. In the case of the cycle method, discharge can take place at any desired point in the circuit.

The finished polyether alcohol is freed from residual alkylene oxide by application of a vacuum. The polyether alcohol is then worked up and freed from readily volatile impurities, preferably by stripping in a tank or column.

In a further preferred embodiment of the novel process, the catalyst fixed bed is located in a back-mixed tank. The back-mixed tank can be, for example, a stirred tank reactor with or without an external circuit, a jet tube reactor with or without pulse exchange tube or a loop reactor with or without pulse exchange tube and with an external circuit, preferably a stirred tank. The heat dissipation may, in addition to the methods described above, be effected by a total condenser. The feed of the starting materials can be effected as described above. It is advantageous in this method that partial alkoxylation of initiator is unnecessary, but the equipment is more complex.

In a further preferred embodiment of the novel process, the adduction of the alkylene oxides takes place in a tubular reactor with a fixed bed. Owing to the increase in volume of the reaction mixture which takes place during the reaction, it is advantageous to feed the starting materials into the reaction mixture at a number of points. It is advantageous here a) to divide the reaction streams or b) to increase the number of reaction steps. Between the tubular reactors, the product streams can be combined at a) and re-divided. This mixing ensures a uniform composition of the product streams. The heat dissipation is effected as for the continuous fixed-bed method.

A further advantageous embodiment of the novel process is the semibatch fixed-bed method. In this, the catalyst is likewise fixed in the reactor. The fixing of the catalyst in the reactor and the design of the reactors conform to those in the continuous fixed-bed method. Owing to the increase in volume of the reaction mixture during the alkylene oxide adduction, installation of a hold tank in the circuit is necessary. The starting materials are added by firstly metering in the initiator, which can be a polyfunctional alcohol or a product of the reaction thereof with alkylene oxides, in a first step and subsequently metering in the alkylene oxides over the entire reaction duration. When the reaction is complete, the reaction tank is emptied, and the polyether alcohol is subjected to conventional work-up. Then, if necessary after the reactor has been rinsed, a new reaction batch can be started. Advantages over the continuous method are that separate partial alkoxylation of the intiator is unnecessary, the molecular weight distribution is usually narrower than in the continuous method, and it is possible to produce small-tonnage products. It is also possible to synthesize various alkylene oxide sequences in a single reactor. A disadvantage is the fitting time between the reaction batches.

In another variant of the semibatch method, the catalyst fixed bed is stored in a back-mixed tank. Examples of back-mixed tanks which can be used are stirred tank reactors with or without an external circuit, jet tube reactors with or without a pulse exchange tube and with an external circuit, loop reactors with or without a pulse exchange tube and with an external circuit, preferably stirred tank reactors. A disadvantage of the stirred tank reactors is that, owing to the increasing fill level as the alkoxylation proceeds and the change in viscosity, the jet-driven back-mixing is not effective in all cases.

A further advantageous embodiment of the novel process is the fixed-bed method with two hold tanks, preferably of equal size, and a fixed-bed reactor. While the first hold tank is emptied by conveying the reaction solution through the fixed-bed reactor, the second tank is thereby filled. During this, alkylene oxide is preferably metered in between the conveying means and the fixed-bed reactor, optionally also between the hold tank and the conveying means, and mixed with the reaction medium. The mixing of the starting materials with the medium can take place with or without a static mixer. When the first tank has been emptied, the system is switched over and reaction solution is conveyed correspondingly from the second tank into the first via the fixed bed. This achieves a particularly narrow molecular weight distribution, which can be further controlled by means of the catalyst particle size. A disadvantage is the comparatively low space-time yield of the process owing to the two tanks.

In all the variants described, it is in principle possible to replace a fixed catalyst bed by a fluidized catalyst bed. In this case, the reaction system can flow through the reactors only from bottom to top in order to keep the catalyst in motion. The advantages of the fluidized bed process are, in particular, that coatings and residues on the solid elements are removed, continuous discharge of the catalyst moldings in accordance with the invention and their regeneration are possible, the entire surface of the molding is available, and flow against the individual moldings is better and consequently the catalytically active centers can be better utilized. Consequently, a higher space-time yield is possible compared with the fixed-bed method.

A disadvantage in this embodiment is the increased catalyst abrasion.

Both the fixed-bed and the fluidized-bed methods can also be carried out in packed columns. This process variant is particularly suitable if the alkylene oxides are in gas form under the reaction conditions. In this case, both cocurrent and countercurrent flow of alkylene oxide and initiator or polyetherol are possible. In the countercurrent method, the initiator or polyetherol are preferably applied to the top of the column and the alkylene oxide to the bottom. This permits a greater phase interface in the column and consequently a better space-time yield in the process.

The novel catalyst can be slowly deactivated by deposits of higher polymeric constituents. Such a deactivation can be countered by washing the catalyst after a certain number of polyetherol synthesis cycles. The washing can be carried out inside or outside the reactor. Preference is given to regeneration in the reactor. For the regeneration, the catalyst is rinsed with a liquid which is capable of removing at least some of the deactivating coatings. Such liquids can be, for example, water, alcohols, ethers, polyethers, esters, polyesters or cyclic carbonates. The regeneration of the catalyst is preferably carried out at temperatures of from 40° C. to 250° C., preferably from 60° C. to 180° C., and at pressures of from 0.1 to 50 bar, preferably from 1 bar to 40 bar.

The catalysts described above are highly suitable for the continuous polymerization of alkylene oxide to give polyether-polyols. In a continuous process of this type, the catalyst can be located in a fixed bed, suspended bed or fluidized bed. Preference is given to a fixed bed or suspended bed. In this case, the polyether-polyols are prepared under the usual conditions for this purpose, namely at between 20 and 250° C. and at between 0.10 and 100 bar, in particular at between 1 and 60 bar.

The supported or shaped double-metal cyanide catalysts of the invention have very high catalytic activity and give polyether alcohols having a very low content of unsaturated constituents. They are very simple to separate from the finished polyether. In the fixed-bed procedure, the filtration process step which has hitherto been necessary can be omitted entirely. The application to the support or the shaping does not impair the catalytic activity of the double-metal cyanide complex catalysts.

The invention is illustrated in greater detail with reference to the Examples below.

EXAMPLES 1 to 5

Preparation of the DMC Catalysts

EXAMPLE 1

400 ml of strong acid ion exchanger (K2431, Bayer) were regenerated twice using 180 g of hydrochloric acid (37% strength) and then washed with water until the washings were neutral. A solution of 40 g of $K_3[Co(CN)_6]$ in 130 g of water was then introduced onto the exchanger column. The column was then eluted until the eluate was neutral again. The cobalt:potassium ratio in the eluate obtained was greater than 10:1. The amount of eluate obtained was 814 g.

407 g of eluate were held at 40° C., and a solution of 19.8 g of zinc(II) acetate dihydrate in 70 g of water was added with stirring. 69.1 g of tert-butanol were then added with stirring and the suspension was stirred at 40° C. for a further 25 minutes. 8.9 g of zinc nitrate hexahydrate in 10 g of water were then added, and the mixture was stirred for a further 5 minutes. The resultant suspension was divided, and one half of the suspension (146 g) was diluted with 80 ml of tert-butanol.

50 g of aluminum oxide grit (grit size 1–1.6 mm) were placed on a spray plate and warmed to 70° C. by means of a fan. The suspension diluted with tert-butanol was sprayed onto the aluminum oxide grit over the course of 1.5 hours. The resultant catalyst was then dried for 16 hours at 25° C. and 15 mbar.

EXAMPLE 2

400 ml of strong acid ion exchanger (K2431, Bayer) were regenerated twice using 180 g of hydrochloric acid (37% strength) and then washed with water until the washings were neutral. A solution of 40 g of $K_3[Co(CN)_6]$ in 130 g of water was then introduced onto the exchanger column. The column was then eluted until the eluate was neutral again. The cobalt:potassium ratio in the eluate obtained was greater than 10:1. The amount of eluate obtained was 710 g.

355 g of eluate were held at 40° C., and a solution of 19.8 g of zinc(II) acetate dihydrate in 70 g of water was added with stirring. 69.1 g of tert-butanol were then added with stirring and the suspension was stirred at 40° C. for a further 25 minutes. 8.9 g of zinc nitrate hexahydrate in 10 g of water were then added, and the mixture was stirred for a further 5 minutes. The solid in the suspension was filtered off with suction, suspended in tert-butanol, filtered off with suction and re-suspended in tert-butanol (187.3 g). 1.7 g of tetraethyl orthosilicate were added to 46.8 g of this suspension.

50 g of aluminum oxide beads (Selexsorb® CD, Aluminum Company of America, diameter 2 mm) were soaked in acetic acid, placed on a spray plate and warmed to 70° C. by means of a fan. The suspension containing tetraethyl orthosilicate was sprayed onto the aluminum oxide beads over the course of 1 hour. The resultant catalyst was then dried for 16 hours at 30° C. and 15 mbar.

EXAMPLE 3

400 ml of strong acid ion exchanger (K2431, Bayer) were regenerated twice using 180 g of hydrochloric acid (37% strength) and then washed with water until the washings were neutral. A solution of 40 g of $K_3[Co(CN)_6]$ in 130 g of water was then introduced onto the exchanger column. The column was then eluted until the eluate was neutral again. The cobalt:potassium ratio in the eluate obtained was greater than 10:1. The amount of eluate obtained was 796 g.

796 g of eluate were held at 40° C., and a solution of 39.6 g of zinc(II) acetate dihydrate in 70 g of water was added with stirring. 69.1 g of tert-butanol were then added with stirring and the suspension was stirred at 40° C. for a further 25 minutes. 17.8 g of zinc nitrate hexahydrate in 40 g of water were then added, and the mixture was stirred for a further 5 minutes. The solid in the suspension was filtered off with suction, suspended in tert-butanol twice more, filtered off with suction and re-suspended in tert-butanol (230.9 g). 8.5 g of tetraethyl orthosilicate were added to 144.3 g of this suspension.

250 g of aluminum oxide beads (Selexsorb® CD, Aluminum Company of America, diameter 2 mm) were soaked in acetic acid, placed on a spray plate and warmed to 70° C. by means of a fan. The suspension containing tetraethyl orthosilicate was sprayed onto the aluminum oxide beads over the course of 1 hour. The resultant catalyst was then dried for 16 hours at 30° C. and 15 mbar.

EXAMPLE 4

1000 ml of strong acid ion exchanger (K2431, Bayer) were regenerated twice using 340 g of hydrochloric acid (37% strength) and then washed with water until the washings were neutral. A solution of 100 g of $K_3[Co(CN)_6]$ in 300 g of water was then introduced onto the exchanger column. The column was then eluted until the eluate was neutral again. The cobalt:potassium ratio in the eluate obtained was greater than 10:1. The amount of eluate obtained was 1563 g.

The resultant eluate was evaporated to 972 g on a rotary evaporator at 50° C. and a pressure of 110 mbar.

A piece of Kanthal metal mesh (10×20 cm) was firstly soaked with a solution of 13.2 g of zinc acetate dihydrate in a mixture of 50 g of water and 35 g of tert-butanol and then dried using a hair dryer. The Kanthal mesh treated in this way was then soaked in a mixture of 97.2 g of the evaporated eluate and 35 g of tert-butanol and re-dried.

The double-metal cyanide component applied exhibited no mechanical abrasion. X-ray diffraction studies showed that the double-metal cyanide component applied had a monoclinic structure.

EXAMPLE 5

In each case, two exchanger columns containing 1000 ml of highly acidic ion exchanger (K2431, Bayer) are regenerated twice with 350 g of HCl (37% HCl content) and then washed with water until the washings are neutral. A solution of 120 g of $K_3[CO(CN)_6]$ in 350 g of water is then applied to each column. The columns are then eluted until the washings are again neutral. The Co:K ratio in the eluate obtained was greater than 10:1. The amount of eluate obtained was 3025 g. 3025 g of eluate are heated to 40° C., and a solution of 237.6 g of Zn(II) acetate dihydrate in 600 g of water is then rapidly added with stirring. 684 g of tert-butanol are then added with stirring, and the suspension is stirred for a further 30 minutes at 40° C. The solid is separated off by filtration, suspended in 2000 g of tert-butanol, stirred for 10 minutes, again filtered off with suction, and washed with 300 g of tert-butanol on the filter. The resultant solid is dried under reduced pressure at 30° C.

EXAMPLE 6

20 g of double metal cyanide from Example 5 together with 18.61 g of silicone resin (SILRES MSE 100, Wacker) and 1.01 g of titanium triisopropoxide are dispersed in 35.7 g of xylene by means of an Ultraturrax. The resultant suspension is transferred into a flask together with 400 g of steatite beads and mixed thoroughly by rotating for 30 minutes in a rotary evaporator. The xylene is then stripped off under reduced pressure at temperatures below 70° C. The fines content is screened off. The content of double metal cyanide on the catalyst is 3% by weight.

EXAMPLE 7

25 g of double metal cyanide from Example 5 together with 23.26 g of silicone resin (SILRES MSE 100, Wacker) and 1.26 g of titanium triisopropoxide are dispersed in 44.63 g of xylene by means of an Ultraturrax. The resultant suspension is transferred into a flask together with 500 g of steatite beads and mixed thoroughly by rotating for 30 minutes in a rotary evaporator. The xylene is then stripped off under reduced pressure at temperatures below 70° C. The fines content is screened off. The content of double metal cyanide on the catalyst is 2% by weight.

EXAMPLE 8

25 g of double metal cyanide from Example 5 together with 23.26 g of silicone resin (SILRES MSE 100, Wacker) and 1.26 g of titanium triisopropoxide are dispersed in 44.63 g of xylene by means of an Ultraturrax. The resultant suspension is transferred into a flask together with 500 g of steatite beads and mixed thoroughly by rotating for 30 minutes in a rotary evaporator. The xylene is then stripped off under reduced pressure at temperatures below 70° C. The fines content is screened off. The content of double metal cyanide on the catalyst is 2.6% by weight.

EXAMPLE 9

A piece of Kanthal metal mesh (10×20 cm) was sprayed simultaneously with a solution of 2.6 g of zinc acetate dihydrate in a mixture of 20 g of water and 10 g of tert-butanol and with a mixture of 19.4 g of evaporated eluate from Example 4 and 10 g of tert-butanol, and dried. This procedure was repeated three times. The double-metal cyanide component applied exhibited no mechanical abrasion. X-ray diffraction studies showed that the double-metal cyanide component applied had a monoclinic structure.

EXAMPLES 10 to 14

Preparation of Polyetherols

For the preparation of the polyetherols by means of the novel catalysts, a 5 l steel reactor with propylene oxide supply and anchor stirrer was used. The reactor was additionally fitted with a heated bypass line beginning at the reactor base and leading via a variable-speed gearpump to a catalyst pipe and from there back to the reactor. The reaction mixture was pumped continuously in this direction through the bypass line. The catalyst pipe (length 500 mm, diameter 18 mm) was fitted with an oil jacket, the oil serving equally to control the temperature of the DMC catalyst and to dissipate the heat formed during the propoxylation. The catalyst pipe was filled with supported DMC catalyst in such a way that the catalyst was fixed in the catalyst pipe and was thus in the form of a fixed bed.

The apparatus allowed two methods of propylene oxide metering:
1. Conventional introduction of propylene oxide into the reactor, with mixing of propylene oxide and reaction mixture in the reactor.
2. Feed of propylene oxide directly before entry into the catalyst pipe and mixing with the reaction mixture in the catalyst pipe.

2 initiators were used:
Initiator 1: An oligopropylene glycol obtained by alkali-catalyzed reaction of dipropylene glycol with propylene oxide at 105° C. This oligopropylene glycol was freed from the catalyst using magnesium silicate and had the following properties: hydroxyl number: 280 mg of KOH/g, molar mass about 400 g/mol; unsaturated constituents: 0.003 meq/g; sodium and potassium contents each less than 1 ppm).

Initiator 2: A commercial rigid foam polyol based on glycerol and propylene oxide, having an OH functionality of 3. The hydroxyl number of initiator 2 was 400 mg of KOH/g.

Operating conditions for the apparatus described above in the preparation of the polyols: About from 510 to 520 g of initiator were introduced into the reactor. The stirring speed was 250 rpm. The internal reactor temperature in all Examples was 115° C. during the reaction, as was the temperature of the heated bypass line. The jacket temperature of the catalyst pipe was between 105 and 106° C. About from 2000 to 2500 g of propylene oxide were metered in; the site of metering (reactor or entry to catalyst pipe) was not changed during an experiment. The volume flow rate in the bypass line was regulated by adjusting the pump speed and was about 5 l/h in all the present experiments.

EXAMPLE 10

The catalyst pipe was charged with 88.7 g of a mixture of catalyst from Example 2 and uncoated Selexsorb® CD in a ratio by weight of 50:50. The catalyst pipe was heated to from 105 to 106° C. and the heatable bypass line to 115° C. 517 g of initiator 1 were introduced into the reactor, heated to 115° C. under a nitrogen atmosphere and degassed for 30 minutes at a reactor internal pressure of <1 mbar. The reactor was then flushed three times with nitrogen by setting a nitrogen pressure of 5 bar in each case and then re-evacuating the reactor. A nitrogen pressure of 1 bar was then set. The bypass line pump was switched on, and the propylene oxide was then metered into the reactor. The metering time was 2 hours. During this, the pressure increased to 2.2 bar and remained constant during the propylene oxide metering. 2007 g of propylene oxide were metered in.

The polyetherol obtained was filtered once. It had a hydroxyl number of 57.3 mg of KOH/g, a content of unsaturated constituents of 0.0073 meq/g and a viscosity of 329 mpa*s at 25° C. Gel permeation chromatography (GPC) was used to determine a number average molecular weight of 1761 g/mol, a weight average molecular weight of 1813 g/mol and a polydispersity of 1.030. The GPC was calibrated using commercial propylene glycol standards.

EXAMPLE 11

The catalyst pipe was charged with 88.7 g of a mixture of catalyst from Example 2 and uncoated Selexsorb® CD in a ratio by weight of 50:50. The catalyst pipe was heated to from 105 to 106° C. and the heatable bypass line to 115° C. 518 g of initiator 1 were introduced into the reactor, heated to 115° C. under a nitrogen atmosphere and degassed for 30 minutes at a reactor internal pressure of <1 mbar. The reactor was then flushed three times with nitrogen by setting a nitrogen pressure of 5 bar in each case and then re-evacuating the reactor. A nitrogen pressure of 1 bar was then set. The bypass line pump was switched on, and the propylene oxide was then metered in at the entry to the catalyst pipe. The metering time was 2 hours. During this, the pressure increased to 2.3 bar and remained constant during the propylene oxide metering. 2008 g of propylene oxide were metered in.

The polyetherol obtained was filtered once. It had a hydroxyl number of 58 mg of KOH/g, a content of unsaturated constituents of 0.0059 meq/g and a viscosity of 307 mpa*s at 25° C. Gel permeation chromatography (GPC) was used to determine a number average molecular weight of 1730 g/mol, a weight average molecular weight of 1789 g/mol and a polydispersity of 1.034. The GPC was calibrated using commercial propylene glycol standards.

EXAMPLE 12

The catalyst pipe was charged with 90.18 g of catalyst from Example 3. The catalyst pipe was heated to from 105 to 106° C. and the heatable bypass line to 115° C. 515 g of initiator 1 were introduced into the reactor, heated to 115° C. under a nitrogen atmosphere and degassed for 30 minutes at a reactor internal pressure of <1 mbar. The reactor was then flushed three times with nitrogen by setting a nitrogen pressure of 5 bar in each case and then re-evacuating the reactor. A nitrogen pressure of 1 bar was then set. The bypass line pump was switched on, and the propylene oxide was then metered in at the entry to the catalyst pipe. The metering time was 2 hours. During this, the pressure increased to 3.2 bar and initially dropped to 2.4 bar during the propylene oxide metering and then rose again to 2.6 bar. 2001 g of propylene oxide were metered in.

The polyetherol obtained was filtered once. It had a hydroxyl number of 58.8 mg of KOH/g, a content of unsaturated constituents of 0.0059 meq/g and a viscosity of 332 mpa*s at 25° C. Gel permeation chromatography (GPC) was used to determine a number average molecular weight of 1657 g/mol, a weight average molecular weight of 1832 g/mol and a polydispersity of 1.106. The GPC was calibrated using commercial propylene glycol standards.

EXAMPLE 13

The catalyst pipe was charged in the lower part with 40.2 g of Selexsorb® CD and in the upper part with 50.7 g of catalyst from Example 1. The catalyst pipe was heated to 105–106° C. and the heatable bypass line to 115° C. 515 g of initiator 1 were introduced into the reactor, heated to 115° C. under a nitrogen atmosphere and degassed for 30 minutes at a reactor internal pressure of <1 mbar. The reactor was then flushed three times with nitrogen by setting a nitrogen pressure of 5 bar in each case and then re-evacuating the reactor. A nitrogen pressure of 1 bar was then set. The bypass line pump was switched on, and the propylene oxide was then metered in at the entry to the catalyst pipe. The metering time was 2.5 hours. During this, the pressure increased to 5 bar and initially dropped to 2.6 bar during the propylene oxide metering and then rose again to 3 bar. 1998 g of propylene oxide were metered in.

The polyetherol obtained was filtered once. It had a hydroxyl number of 64 mg of KOH/g, a content of unsaturated constituents of 0.0234 meq/g and a viscosity of 344 mpa*s at 25° C. Gel permeation chromatography (GPC) was used to determine a number average molecular weight of 1523 g/mol, a weight average molecular weight of 1783 g/mol and a polydispersity of 1.170. The GPC was calibrated using commercial propylene glycol standards.

EXAMPLE 14

The catalyst pipe was charged with 90 g of a mixture of uncoated Selexsorb® CD and catalyst from Example 3 in a weight ratio of 50:50. The catalyst pipe was heated to from 105 to 106° C. and the heatable bypass line to 115° C. 265 g of initiator 2 were introduced into the reactor, heated to 115° C. under a nitrogen atmosphere and degassed for 30 minutes at a reactor internal pressure of <1 mbar. The reactor was then flushed three times with nitrogen by setting a nitrogen pressure of 5 bar in each case and then re-evacuating the reactor. A nitrogen pressure of 1 bar was then set. The bypass line pump was switched on, and the propylene oxide was then metered in at the entry to the catalyst pipe. The metering time was 3 hours. During this, the pressure increased to 4.8 bar and initially dropped to 1.8 bar during the propylene oxide metering and then gradually rose to 2.5 bar. 2244 g of propylene oxide were metered in.

The polyetherol obtained was filtered once. It had a hydroxyl number of 45.1 mg of KOH/g, a content of unsaturated constituents of 0.0130 meq/g and a viscosity of 878 mpa*s at 25° C. Gel permeation chromatography (GPC) was used to determine a number average molecular weight of 2781 g/mol, a weight average molecular weight of 3280 g/mol and a polydispersity of 1.180. The GPC was calibrated using commercial propylene glycol standards.

EXAMPLE 15

The catalyst tube was filled with 90.2 g of a mixture of catalyst from Example 6 and uncoated Selexsorb® CD in a weight ratio of 50:50. The catalyst tube was heated to between 105 and 106° C. and the heatable bypass line was heated to 115° C. 502 g of initiator 1 and 2020 g of polyetherol were introduced into the reactor. The polyetherol had a hydroxyl number of 58.3 mg of KOH/g, a content of unsaturated constituents of 0.0073 meq/g. Gel permeation chromatography (GPC) was used to measure a number average molecular weight of 1758 g/mol, a weight average molecular weight of 1811 g/mol and a polydispersity of 1.029, the GPC being calibrated using commercial polypropylene glycol standards.

A mixture of initiator 1 and polyetherol in a weight ratio of 80%/20% was introduced into a further storage tank. The two tanks were heated to 115° C. under a nitrogen atmosphere and degassed for minutes at a reactor internal pressure of <1 mbar. The tanks were then flushed three times with nitrogen by introducing nitrogen to a pressure of 5 bar and then re-evacuating the tanks. The nitrogen pressure was then set to 1 bar. The bypass line pump was switched on, and the propylene oxide/initiator mixture was then metered into the reactor. The same amount was continuously run out of the tank, under level control, into a collecting vessel. The metering time was 20 hours, during which the pressure rose to 2.1 bar and remained constant during the propylene oxide metering. 20087 g of propylene oxide and 5007 g of initiator were metered in.

The polyetherol obtained was filtered once. It had a hydroxyl number of 53.3 mg of KOH/g, a content of unsaturated constituents of 0.0087 meq/g and a viscosity of 396 mpa*s at 25° C. Gel permeation chromatography (GPC) was used to measure a number average molecular weight of 1762 g/mol, a weight average molecular weight of 1814 g/mol and a polydispersity of 1.210, the GPC being calibrated using commercial propylene glycol standards.

EXAMPLES 16 to 23

The catalyst tube was filled with 223 g of catalyst from Example 6. The catalyst tube was heated to 125° C. and the heatable bypass line was heated to 115° C. The amounts of initiator 1 shown in Table 1 were introduced into the reactor, heated to 115° C. under a nitrogen atmosphere and degassed for 30 minutes at the reactor internal pressure of <1 mbar. The reactor was then flushed three times with nitrogen by introducing nitrogen to a pressure of 5 bar and then re-evacuating the reactor. The nitrogen pressure was then set to 1 bar. The bypass line pump was switched on, and, in Examples 16 and 22, the propylene oxide was then metered into the reactor and in Example 23 it was metered in upstream of the catalyst tube. The metering time was 3 hours. The amounts of propylene oxide shown in Table 1 were added.

The polyetherols obtained were filtered once. The hydroxyl numbers, the contents of unsaturated constituents and the viscosities are shown in Table 1. Gel permeation chromatography (GPC) was used to measure the number average molecular weights, weight average molecular weights and polydispersities, the GPC being calibrated using commercial polypropylene glycol standards. The data are also shown in Table 1.

TABLE 1

Data for Examples 16 to 23

| Example | Precursor [g] | PO [g] | OH number [mg of KOH/g] | Viscosity [mPAS 25° C.] | Unsaturated constituents [meq/g] | Mn [g/mol] | $M_W$ [g/mol] | D |
|---|---|---|---|---|---|---|---|---|
| 16 | 502.8 | 1979.2 | 56.8 | 364 | 0.0096 | 1804 | 1983 | 1.099 |
| 17 | 507.6 | 1998.0 | 55.7 | 441 | 0.0110 | 1796 | 2200 | 1.225 |
| 18 | 503.7 | 1982.7 | 56.4 | 522 | 0.0126 | 1801 | 2401 | 1.333 |
| 19 | 503.0 | 1980.0 | 56.9 | 593 | 0.0136 | 1769 | 2515 | 1.422 |
| 20 | 501.3 | 1973.3 | 56.8 | 624 | 0.0147 | 1751 | 2598 | 1.484 |
| 21 | 508.0 | 1999.7 | 57.3 | 769 | 0.0148 | 1767 | 2728 | 1.544 |
| 22 | 503.2 | 1980.8 | 57.5 | 946 | 0.0146 | 1753 | 2885 | 1.646 |
| 23 | 462.9 | 1822.1 | 58.8 | 1073 | 0.0163 | 1687 | 2891 | 1.714 |

EXAMPLES 24 to 27

The catalyst tube was filled with 222 g of catalyst from Example 7. The catalyst tube was heated to 125° C. and the heatable bypass line was heated to 115° C. The amounts of initiator 1 shown in Table 2 were introduced into the reactor, heated to 115° C. under a nitrogen atmosphere and degassed for 30 minutes at the reactor internal pressure of <1 mbar. The reactor was then flushed three times with nitrogen by introducing nitrogen to a pressure of 5 bar and then re-evacuating the reactor. The nitrogen pressure was then set to 1 bar. The bypass line pump was switched on, and the propylene oxide was then metered in upstream of the catalyst tube. The metering time was 3 hours. The amounts of propylene oxide shown in Table 2 were added.

The polyetherols obtained were filtered once. The hydroxyl numbers, the contents of unsaturated constituents and the viscosities are shown in Table 2.-

Gel permeation chromatography (GPC) was used to measure the number average molecular weights, weight average molecular weights and polydispersities, the GPC being calibrated using commercial polypropylene glycol standards. The data are also shown in Table 2.

TABLE 2

Data for Examples 24 to 27

| Example | Precursor [g] | PO [g] | OH number [mg of KOH/g] | Viscosity [mPAS 25° C.] | Unsaturated constituents [meq/g] | Mn [g/mol] | $M_W$ [g/mol] | D |
|---|---|---|---|---|---|---|---|---|
| 24 | 505.9 | 1991.1 | 56.2 | 399 | 0.0116 | 1882 | 2119 | 1.126 |
| 25 | 502.3 | 1876.9 | 57.0 | 584 | 0.0142 | 1834 | 2449 | 1.335 |
| 26 | 503.8 | 1982.8 | 67.7 | 737 | 0.0160 | 1781 | 2684 | 1.507 |
| 27 | 503.7 | 1982.3 | 66.8 | 938 | 0.0180 | 1792 | 2810 | 1.568 |

EXAMPLES 28 to 37

The catalyst tube was filled with 220 g of catalyst from Example 8. The catalyst tube was heated to 125° C. and the heatable bypass line was heated to 115° C. The amounts of initiator 1 shown in Table 3 were introduced into the reactor, heated to 115° C. under a nitrogen atmosphere and degassed for 30 minutes at the reactor internal pressure of <1 mbar. The reactor was then flushed three times with nitrogen by introducing nitrogen to a pressure of 5 bar and then re-evacuating the reactor. The nitrogen pressure was then set to 1 bar. The bypass line pump was switched on, and the propylene oxide was then metered in upstream of the catalyst tube. The amounts of propylene oxide shown in Table 3 were added.

The polyetherols obtained were filtered once. The hydroxyl numbers, the contents of unsaturated constituents and the viscosities are shown in Table 3. Gel permeation chromatography (GPC) was used to measure the number average molecular weights, weight average molecular weights and polydispersities, the GPC being calibrated using commercial polypropylene glycol standards. The data are also shown in Table 3.

After the experiments for Examples 30, 33 and 36, the catalyst installed in the catalyst tube was flushed with ethanol for 1 hour at 105° C. in the catalyst tube. The catalyst treated in this way was dried in the catalyst tube and used for further polyol syntheses. This rinsing treatment allowed some of the deactivating coatings to be removed and the drop in activity of the catalyst to be slowed.

We claim:
1. A process for the preparation of a double-metal cyanide catalyst, which comprises reacting a solution of a metal salt of the formula $M^1_m (X)_n$ where

$M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$ and $Cd^{2+}$, X is an anion selected from the group consisting of halide, hydroxide, sulfate, carbonate, cyanide, thiocyanate, isocyanate, cyanate, carboxylate, oxalate and nitrate, and m and n are selected such that the compound is electrically neutral, with a solution of a cyanometallate compound of the formula $H_a M^2(CN)_b(A)_c$, where H is a hydrogen ion, $M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$ and $M^1$ and $M^2$ are identical or different, A is an anion selected from the group consisting of halide, hydroxide, sulfate, carbonate, cyanide, thiocyanate, isocyanate, cyanate, carboxylate, oxalate and nitrate, where A and X may be identical or different, and a, b, c are selected such that the compound is electrically neutral, where at least one of the two solutions contains a water-soluble ligand selected from the group consisting of alcohols, aldehydes, ketones, ethers, polyethers, esters, ureas, amides, nitriles and sulfides, or this ligand is added after the two solutions are combined, wherein the reaction is carried out in the presence of a solid, inert, unfoamed

TABLE 3

Data for Examples 28 to 37

| Example | Precursor [g] | PO [g] | OH number [mg of KOH/g] | Viscosity [mPAS 25° C.] | Unsaturated constituents [meq/g] | Mn [g/mol] | $M_W$ [g/mol] | D |
|---|---|---|---|---|---|---|---|---|
| 28 | 505.2 | 2020.8 | 56.2 | 420 | 0.0088 | 1854 | 2141 | 1.155 |
| 29 | 500.7 | 2002.8 | 56.2 | 511 | 0.0121 | 1833 | 2335 | 1.274 |
| 30 | 503.5 | 2014.0 | 56.4 | 624 | 0.0168 | 1801 | 2481 | 1.378 |
| 31 | 502.1 | 2008.4 | 56.7 | 506 | 0.0152 | 1813 | 2339 | 1.290 |
| 32 | 502.1 | 2008.4 | 56.4 | 623 | 0.0165 | 1798 | 2501 | 1.290 |
| 33 | 502.3 | 2009.2 | 57.7 | 702 | 0.0161 | 1828 | 2762 | 1.510 |
| 34 | 499.9 | 1999.6 | 57.6 | 579 | 0.0147 | 1792 | 2569 | 1.434 |
| 35 | 501.7 | 2006.8 | 56.9 | 774 | 0.0170 | 1781 | 2813 | 1.580 |
| 36 | 501.6 | 2006.4 | 56.5 | 916 | 0.0170 | 1768 | 2957 | 1.672 |
| 37 | 501.3 | 2005.2 | 56.9 | 923 | 0.0186 | 1785 | 2793 | 1.565 | support or the suspension formed after the starting materials have been combined is applied to a solid, inert, unfoamed support and the solvent is removed, or the double-metal cyanide is separated from the solution, worked up if necessary, resuspended and applied to a solid, inert, unfoamed support.

2. A process for the preparation of a double-metal cyanide catalyst, which comprises reacting the solution of a metal salt of a formula $M^1_m (X)_n$ where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$ and $Cd^{2+}$, X is an anion selected from the group consisting of halide, hydroxide, sulfate, carbonate, cyanide, thiocyanate, isocyanate, carboxylate, oxalate and nitrate, and m and n are selected such that the compound is electrically neutral, with a solution of a cyanometallate compound of the formula $H_a M^2(CN)_b(A)_c$, where H is a hydrogen ion, $M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$ and $M^1$ and $M^2$ are identical or different, A is an anion selected from the group consisting of halide, hydroxide, sulfate, carbonate, cyanide, thiocyanate, isocyanate, carboxylate, oxalate and nitrate, where A and X may be identical or different, a, b, c are selected such that the compound is electrically neutral, where at least one of the two solutions contains at least one water-soluble ligand selected from the group consisting of alcohols, aldehydes, ketones, ethers, polyethers, esters, ureas, amides, nitriles and sulfides, or this ligand is added after the two solutions are combined, wherein the reaction is carried out in the presence of a solid, inert, unfoamed support or the double-metal cyanide is separated from the suspension, optionally worked up and then converted into moldings, optionally together with inert, pulverulent material.

3. A process as claimed in claim 1, wherein the solid, inert, unfoamed support consists of inorganic or organic material.

4. A process as claimed in claim 1, wherein the solid, inert, unfoamed support is a solid, inert metallic support.

5. A process as claimed in claim 1, wherein the solid, inert, unfoamed support is a solid, inert oxide.

6. A process as claimed in claim 1, wherein the solid, inert, unfoamed support is a solid, inert polymer.

7. A process as claimed in claim 1, wherein the solid, inert, unfoamed support is a solid, inert carbide.

8. A process as claimed in claim 1, wherein the double-metal cyanide is applied to the inner wall of a reactor.

9. A double-metal cyanide catalyst, which can be prepared as claimed in any of claims 1 to 8, in a fixed bed.

10. A process for the preparation of polyether alcohols by catalytic ring-opening polymerization of alkylene oxides, which comprises using a double-metal cyanide catalyst as claimed in claim 9 as catalyst.

11. A continuous process for the preparation of polyether alcohols by catalytic ring-opening polymerization of alkylene oxides, which comprises using a double-metal cyanide catalyst as claimed in claim 9 as catalyst.

12. A process as claimed in claim 2, wherein the solid, inert, unfoamed support is a solid, inert metallic support.

13. A process as claimed in claim 2, wherein the solid, inert, unfoamed support is a solid, inert oxide.

14. A process as claimed in claim 2, wherein the solid, inert, unfoamed support is a solid, inert polymer.

15. A process as claimed in claim 2, wherein the solid, inert, unfoamed support is a solid, inert carbide.

16. A double-metal cyanide catalyst, which can be prepared as claimed in any of claims 12 to 15, as a fixed bed.

* * * * *